(12) United States Patent
Yan

(10) Patent No.: US 10,545,591 B2
(45) Date of Patent: Jan. 28, 2020

(54) DISPLAY PANEL FOR TOUCH PURPOSE, METHOD FOR FORMING THE SAME, AND DISPLAY DEVICE COMPRISING THE SAME

(71) Applicants: Boe Technology Group Co., Ltd., Beijing (CN); Chongqing Boe Optoelectronics Technology Co., Ltd., Chongqing (CN)

(72) Inventor: Jinglong Yan, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

(*) Notice: Subject to any disclaimer, the term of this patent is extended or adjusted under 35 U.S.C. 154(b) by 84 days.

(21) Appl. No.: 15/512,447

(22) PCT Filed: Jan. 14, 2016

(86) PCT No.: PCT/CN2016/070867
§ 371 (c)(1),
(2) Date: Mar. 17, 2017

(87) PCT Pub. No.: WO2017/020558
PCT Pub. Date: Feb. 9, 2017

(65) Prior Publication Data
US 2017/0285822 A1    Oct. 5, 2017

(30) Foreign Application Priority Data

Aug. 4, 2015   (CN) .......................... 2015 1 0469994

(51) Int. Cl.
*G06F 3/041*    (2006.01)
*G06F 3/044*    (2006.01)

(52) U.S. Cl.
CPC ............ *G06F 3/0412* (2013.01); *G06F 3/044* (2013.01); *G06F 2203/04103* (2013.01)

(58) Field of Classification Search
CPC ................... G06F 3/041; G06F 3/0412; G06F 2203/04103
See application file for complete search history.

(56) References Cited

U.S. PATENT DOCUMENTS 9,098,145 B2 *   8/2015   Zhao ..................... G06F 3/0412
9,285,916 B2 *   3/2016   Xi ........................... G06F 3/047
(Continued)

FOREIGN PATENT DOCUMENTS

CN   101488066       7/2009
CN   101488066 A     7/2009
(Continued)

OTHER PUBLICATIONS

First Office Action for Chinese Patent Application No. 201510469994.6 dated Jun. 14, 2017.
(Continued)

*Primary Examiner* — Kwang-Su Yang
(74) *Attorney, Agent, or Firm* — Calfee, Halter & Griswold LLP

(57) ABSTRACT

This disclosure relates to the field of display technologies, and specifically to a display panel, a method for forming the same and a display device. The display panel includes an array substrate; a counter substrate aligned with the array substrate; and a parallel plate capacitor for realizing signal transmission between the array substrate and the counter substrate. Two capacitive plates of the parallel plate capacitor are located on opposite surfaces of the array substrate and the counter substrate respectively. Thus, conduction between the array substrate and the counter substrate is realized, and existing problems such as non-uniform cell thickness and
(Continued)

light leakage caused by such conduction realized through conductive gold balls and so on are eliminated.

16 Claims, 2 Drawing Sheets

(56) References Cited

U.S. PATENT DOCUMENTS

| | | |
|---|---|---|
| 2009/0201269 A1 | 8/2009 | Kato et al. |
| 2011/0193818 A1* | 8/2011 | Chen ................ G06F 3/041 |
| | | 345/174 |
| 2012/0242635 A1* | 9/2012 | Erhart ............... G06F 1/1626 |
| | | 345/207 |
| 2012/0319991 A1* | 12/2012 | Yang ................ G06F 3/044 |
| | | 345/174 |
| 2013/0169576 A1* | 7/2013 | Wang ............... G06F 3/0416 |
| | | 345/173 |
| 2014/0168138 A1 | 6/2014 | Kuo et al. |
| 2014/0168161 A1* | 6/2014 | Sugita .............. G06F 3/044 |
| | | 345/174 |
| 2015/0193057 A1* | 7/2015 | Kosugi .............. G06F 3/0412 |
| | | 345/174 |
| 2015/0301381 A1* | 10/2015 | Okita ................ G02F 1/13338 |
| | | 349/12 |
| 2015/0364117 A1* | 12/2015 | Azumi .............. G09G 3/3655 |
| | | 345/174 |
| 2016/0004899 A1* | 1/2016 | Pi .................... G06F 1/1626 |
| | | 345/173 |
| 2016/0048232 A1 | 2/2016 | Liu et al. |
| 2017/0024077 A1* | 1/2017 | Lin ................... G06F 3/0416 |

FOREIGN PATENT DOCUMENTS

| | | |
|---|---|---|
| CN | 102830881 | 12/2012 |
| CN | 102830881 A | 12/2012 |
| CN | 103176674 | 6/2013 |
| CN | 103488366 | 1/2014 |
| CN | 103488366 A | 1/2014 |
| CN | 104978096 | 10/2015 |

OTHER PUBLICATIONS

International Search Report and Written Opinion from PCT/CN16/70867 dated Apr. 29, 2016.

* cited by examiner

DISPLAY PANEL FOR TOUCH PURPOSE, METHOD FOR FORMING THE SAME, AND DISPLAY DEVICE COMPRISING THE SAME

The present application is the U.S. national phase entry of PCT/CN2016/070867, with an international filing date of Jan. 14, 2016, which claims the benefit of Chinese Patent Application No. 201510469994.6, filed on Aug. 4, 2015, the entire disclosures of which are incorporated herein by reference.

FIELD

This disclosure relates to the field of display technologies, and specifically to a display panel, a method for forming the same and a display device.

BACKGROUND ART

In the field of display technologies, display panels can be divided into three types: out-cell, on-cell and in-cell, depending on a difference in the position of a touch sensor. For an out-cell type display panel, the touch sensor is directly formed on the display panel, which increases an overall cell thickness and reduces the light transmittance. For an on-cell type display panel, the touch sensor is formed on an outer side of a counter substrate of the display panel, which decreases the overall cell thickness, but increases a process for fabricating a counter substrate. In contrast, in an in-cell type display panel, the touch sensor is directly formed inside the display panel, which not only avoids increase of the overall cell thickness, but also simplifies the manufacture process by fabricating the touch sensor together with the display panel. By virtue of advantages mentioned above, in-cell technology is becoming more and more popular in the field of display and has gradually become the mainstream technology.

For some in-cell type display panels, when a sensing electrode of the touch sensor is located on an array substrate of the display panel and a corresponding touch electrode is also located on the array substrate or on a counter substrate of the display panel, it is usually necessary to form conductive gold balls between the array substrate and the counter substrate so as to enable transmission of a touch signal between the array substrate and the counter substrate. However, in this solution, the conductive gold balls can easily cause non-uniformity of the overall cell thickness, which then gives rise to display defects such as light leakage. Likewise, for an ordinary display panel, i.e., an out-cell type or on-cell type display panel, various electric signals and power supplies are generally provided at the array substrate, so generally it is also necessary to realize conduction between the array substrate and the counter substrate.

SUMMARY

In one aspect, an embodiment of this disclosure provides a display panel. The display panel comprises: an array substrate; a counter substrate aligned with the array substrate; and a parallel plate capacitor for realizing signal transmission between the array substrate and the counter substrate. Two capacitive plates of the parallel plate capacitor are located on opposite surfaces of the array substrate and the counter substrate respectively.

Based on the above, the display panel provided in an embodiment of this disclosure comprises a parallel plate capacitor for realizing signal transmission between the array substrate and the counter substrate. In such a technical solution, conduction between the array substrate and the counter substrate can be realized by taking advantage of the transmittability of alternating signals through a capacitor. As compared with the existing technical solution using conductive gold balls, this disclosure only needs to form corresponding capacitive plate layers on the array substrate and the counter substrate respectively, without any objects to be sandwiched between the two substrates. In this way, not only a manufacture process of the display panel is simplified while still realizing signal transmission, but also problems such as non-uniform overall cell thickness of the display panel caused by existence of any object in the cell can be avoided.

Furthermore, the display panel further comprises: a sensing electrode and a driving electrode, which are both located on a surface of the counter substrate facing the array substrate. In this case, a touch function will be added to the display panel provided in the embodiment of this disclosure, thereby achieving touch display. Meanwhile, by using the parallel plate capacitor, signal transmission between the array substrate and the counter substrate can be realized.

Furthermore, the display panel further comprises: a sensing electrode which is located on a surface of the counter substrate facing the array substrate; and a driving electrode which is located on a surface of the array substrate facing the counter substrate, wherein the signal comprises a touch signal. With such an arrangement, transmission of a touch signal between the counter substrate and the array substrate can be realized.

Furthermore, the touch signal can also comprise a pulse square wave signal. Apparently, it should be pointed out that this disclosure is not limited thereto.

Furthermore, the capacitive plates are designed to have a ring shape. Besides, a ring number of the capacitive plate on the array substrate is smaller than that of the capacitive plate on the counter substrate. Alternatively, a ring number of the capacitive plate on the counter substrate is smaller than that of the capacitive plate on the array substrate. As can be understood by those skilled in the art, when the two capacitive plates of the parallel plate capacitor are designed to have a ring shape, an electromagnetic field will be generated between the capacitive plates due to the electromagnetic induction phenomenon. Furthermore, by designing a ring turn number of a capacitive plate at an input end of the signal to be smaller than that of a capacitive plate at an output end of the signal, enhancement of the signal to be transmitted will be further facilitated. In this manner, loss of the signal during normal transmission will be compensated to a certain degree.

Specifically, the capacitive plate on the array substrate is designed to have a single-ring shape, and the capacitive plate on the counter substrate is designed to have a double-ring shape by means of two metal layers. Alternatively, the capacitive plate on the counter substrate is designed to have a single-ring shape, and the capacitive plate on the array substrate is designed to have a double-ring shape by means of two metal layers.

Specifically, the rings can be square rings, circular rings or polygonal rings. In other words, the rings in the technical solution of this disclosure are not limited to any specific ring shape, as long as they are generally rings such that a corresponding electromagnetic field can be generated.

Furthermore, a distance between the capacitive plates is reduced to facilitate transmission of the signal. As can be understood by those skilled in the art, for a parallel plate capacitor, a reduction in the distance between the capacitive plates will decrease the capacitance, and thereby transmission of the signal transmitted therethrough will be enhanced.

Furthermore, the capacitive plates are designed to have same block patterns. Besides, the block patterns can be square blocks, circular blocks or polygonal blocks. In contrast with the ring capacitive plate patterns mentioned above, for two parallel capacitive plates with the same block patterns, the electromagnetic induction phenomenon will not occur, and hence compensation of the signal to be transmitted will not be achieved. However, by using the same block patterns, the manufacture process will be made even simpler, and the technical problem of conduction between the array substrate and the counter substrate to be solved by this disclosure will also be addressed.

Furthermore, the capacitive plate on the array substrate can be an ITO layer. Besides, the capacitive plate on the counter substrate can be an ITO layer or a metal layer. Using a transparent ITO layer not only realizes conduction between the array substrate and the counter substrate, but also avoids shielding and loss of light transmitted therebetween.

Furthermore, the display panel further comprises a black shielding layer located between the counter substrate and the capacitive plate thereon. Specifically, the black shielding layer is made of a non-conductive material, and can be made of resin, graphite or the like. Such a black shielding layer can be used for shielding regions between adjacent pixel electrodes on the array substrate, such that light will not be emitted out from these gap regions. In this way, possible problems of the display panel such as light leakage or reduced contrast will be avoided.

Furthermore, the display panel further comprises an insulating layer located over the array substrate and the capacitive plate thereon. Such an insulating layer can be used for facilitating formation of other layers (e.g., an ITO layer and so on) over the array substrate having the capacitive plate.

In another aspect, an embodiment of this disclosure further provides a method for forming such a display panel. The method comprises: forming an array substrate; forming a counter substrate aligned with the array substrate; and providing a parallel plate capacitor for realizing signal transmission between the array substrate and the counter substrate. Specifically, two capacitive plates of the parallel plate capacitor are located on opposite surfaces of the array substrate and the counter substrate respectively. With reference to the above depiction of the display panel, the method for forming such a display panel not only simplifies the manufacture process of the display panel while still realizing signal transmission, but also avoids problems such as non-uniform overall cell thickness of the display panel caused by existence of any object in the cell.

Furthermore, the method further comprises: forming a sensing electrode and a driving electrode on a surface of the counter substrate facing the array substrate respectively. In this case, a touch function will be added to the display panel formed by the method provided in the embodiment of this disclosure, thereby achieving touch display. Meanwhile, by using the parallel plate capacitor, signal transmission between the array substrate and the counter substrate can be realized.

Furthermore, the method further comprises: forming a sensing electrode on a surface of the counter substrate facing the array substrate; and forming a driving electrode on a surface of the array substrate facing the counter substrate, wherein the signal comprises a touch signal. With such an arrangement, transmission of a touch signal between the counter substrate and the array substrate can be realized.

Furthermore, the capacitive plates are designed to have a ring shape. Besides, a ring number of the capacitive plate on the array substrate is smaller than that of the capacitive plate on the counter substrate. Alternatively, a ring number of the capacitive plate on the counter substrate is smaller than that of the capacitive plate on the array substrate. As mentioned in the above depiction of the display panel, such an arrangement will facilitate enhancement of the signal to be transmitted, which will in turn compensate loss of the signal during normal transmission to a certain degree.

Furthermore, the method further comprises reducing a distance between the capacitive plates to facilitate transmission of the signal. As mentioned in the above depiction about the display panel, at this stage, the capacitance will be decreased, and thereby output of the signal transmitted therethrough will be enhanced.

In yet another aspect, an embodiment of this disclosure further provides a display device, comprising any of the display panels mentioned above. With reference to the above depiction of the display panel, the display device comprising such a display panel not only simplifies the manufacture process of the display panel while still realizing signal transmission, but also avoids problems such as non-uniform overall cell thickness of the display panel caused by existence of any object in the cell.

BRIEF DESCRIPTION OF DRAWINGS

Some exemplary embodiments of this disclosure will be described in detail below with reference to the drawings. In the drawings.

It should be pointed out that in all drawings, same reference signs are used for indicating same or similar elements, and the drawings are not necessarily drawn to scale, wherein some elements may be exaggerated for illustration of some features of this disclosure.

DETAILED DESCRIPTION OF EMBODIMENTS

Embodiments of this disclosure provide a display panel, a method for forming the same and a display device. In the disclosed embodiments, conduction between the array substrate and the counter substrate can be realized, and existing problems such as non-uniform cell thickness and light leakage caused by such conduction realized through conductive gold balls and so on can be eliminated.

Figure 1:
FIG. 1 is a schematic section view of a display panel according to an embodiment of this disclosure.

As shown in FIG. 1, a display panel 10 according to an embodiment of this disclosure may comprise: an array substrate 110 and a counter substrate 120 aligned with the array substrate 110. The display panel 10 may further comprise a parallel plate capacitor for realizing signal transmission between the array substrate 110 and the counter substrate 120. Specifically, two capacitive plates 130 and 140 of the parallel plate capacitor can be located on opposite surfaces of the array substrate 110 and the counter substrate 120 respectively. In such a technical solution, conduction between the array substrate 110 and the counter substrate 120 can be realized by taking advantage of the transmittability characteristics of alternating signals through a capacitor. As compared with the existing technical solution using conductive gold balls, this disclosure only needs to form corresponding capacitive plate layers 130 and 140 on the array substrate 110 and the counter substrate 120 respectively, without any objects to be sandwiched between the two substrates 110 and 120. In this way, not only the manufacture process of the display panel 10 can be simplified while still realizing signal transmission, but also problems such as non-uniform overall cell thickness of the display panel caused by existence of any object in the cell will be avoided.

The two capacitive plates 130 and 140 can be made of a metal material.

Specifically, the capacitive plate 130 on the array substrate 110 can be an ITO layer, while the capacitive plate 140 on the counter substrate 120 can be an ITO layer or a metal layer. Using a transparent ITO layer not only realizes conduction between the array substrate 110 and the counter substrate 120, but also avoids shielding and loss of light transmitted therebetween.

At this time, if an alternating signal is provided at the array substrate 110, due to the existence of the parallel plate capacitor between the array substrate 110 and the counter substrate 120, the signal can be successfully transmitted to the counter substrate 120 through the two capacitive plates 130 and 140. With regard to the case where the signal is provided at the counter substrate 120, the effect is also applicable. The only difference there is the transmission direction of the signal, i.e. in this case from the counter substrate 120 to the array substrate 110.

Additionally, the display panel 10 according to the embodiments of this disclosure can further optionally comprise a black shielding layer located between the counter substrate 120 and the capacitive plate 140 thereon. The black shielding layer can be made of a non-conductive material. For example, it can be made of resin, graphite or the like. Such a black shielding layer can be used for shielding regions between adjacent pixel electrodes on the array substrate 110, such that light will not be emitted out from these gap regions. This helps to avoid possible problems of the display panel 10 such as light leakage or reduced contrast.

Moreover, the display panel 10 according to the embodiments of this disclosure can further comprise an insulating layer located over the array substrate 110 and the capacitive plate 130 thereon. Such an insulating layer can be used for facilitating formation of other layers (e.g., an ITO layer and so on) over the array substrate 110 having the capacitive plate 130.

Figure 2A:
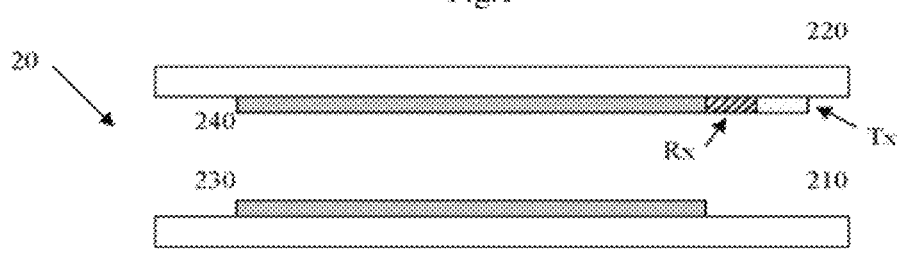
FIGS. 2A and 2B are respectively schematic section views of a display panel according to another embodiment of this disclosure.
Figure 2B:
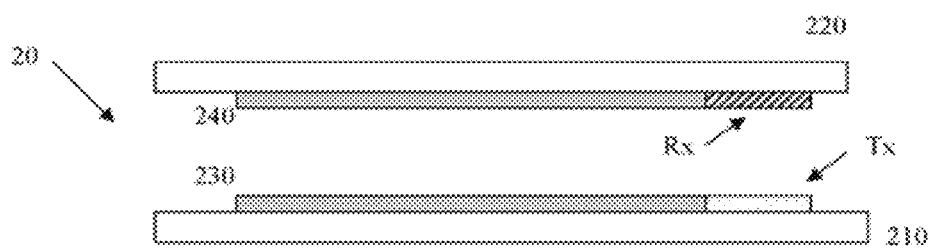
Figure 3:
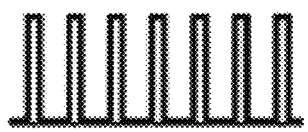
FIG. 3 is a schematic example of a signal to be transmitted according to an embodiment of this disclosure.

FIGS. 2A and 2B are respectively schematic section views of a display panel 20 according to another embodiment of this disclosure. The structure of the display panel 20 in FIGS. 2A and 2B is generally similar to that of the display panel 10 in FIG. 1, except that the display panel 20 now further comprises a sensing electrode Rx and a driving electrode Tx which are both located on a lower side of the counter substrate 220 (see FIG. 2A), or a sensing electrode Rx and a driving electrode Tx which are located on a lower side of the counter substrate 220 and an upper side of the array substrate 210 respectively (see FIG. 2B). When the sensing electrode Rx and the driving electrode Tx are both located on the lower side of the counter substrate 220, i.e., in a case as shown in FIG. 2A, a touch function will be further added to the display panel 10 provided in the embodiments of this disclosure, thereby achieving touch display. Meanwhile, by using the parallel plate capacitor, signal transmission between the array substrate 210 and the counter substrate 220 can be realized. Corresponding to FIG. 2A, when the sensing electrode Rx and the driving electrode Tx are located on the counter substrate 220 and the array substrate 210 respectively, i.e., in a case as shown in FIG. 2B, the signal to be transmitted can be a touch signal. FIG. 3 shows a schematic example of the signal, which is specifically a pulse square wave signal. Now, similar to the case as shown in FIG. 1, the touch signal can be transmitted from the array substrate 210 to the counter substrate 220 through the parallel capacitive plate 230 and 240.

Furthermore, a distance between the capacitive plates 130 and 140 can be reduced to facilitate transmission of the signal. As can be understood by those skilled in the art, for a parallel plate capacitor, a reduction in the distance between the capacitive plates 130 and 140 helps to decrease the capacitance, and thereby enhances transmission of the signal transmitted therethrough.

Figure 4:
FIG. 4 is a schematic example of a ring shape design for a capacitive plate according to an embodiment of this disclosure.

FIG. 4 is a schematic example of a ring shape design for a capacitive plate according to an embodiment of this disclosure. As described above, after passing through the capacitor, the signal to be transmitted will suffer more or less certain loss. To compensate such loss, in an embodiment of this disclosure, the plates 130 and 140 of the parallel plate capacitor are designed to have a ring shape. Specifically, when the signal is transmitted between the array substrate 110 and the counter substrate 120, an electromagnetic induction phenomenon will occur within the ring-shaped capacitive plates 130 and 140 due to a charge and discharge process of the parallel plate capacitor. In this case, the ring turn number of the two capacitive plates 130 and 140 can be adjusted such that a ring number of an input end (i.e., the capacitive plate 130 on the array substrate 110 in this embodiment) is smaller than that of an output end (i.e., the capacitive plate 140 on the counter substrate 120 in this embodiment). As compared to a situation without such a ring shape design, the outputted signal will be enhanced to a certain degree. With reference to FIG. 4, exemplary ring shape designs for the input end and the output end are shown respectively, wherein a single-ring shape on the left corresponds to the input end and a double-ring shape on the right corresponds to the output end. Obviously, as used herein, the ring shape are not limited to the square ring shape as shown in FIG. 4, and they can also be circular ring shape, polygonal ring shape or the like.

Figure 5:
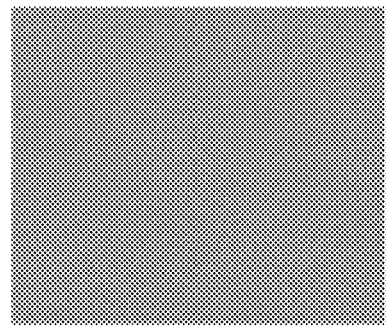
FIG. 5 is a schematic example of a block pattern design for a capacitive plate according to an embodiment of this disclosure.

FIG. 5 is a schematic example of a further shape design, i.e., a block pattern design, for a capacitive plate according to an embodiment of this disclosure. As compared with the ring shape capacitive plates in FIG. 4, now due to the existence of the parallel plate capacitor, signal transmission between the array substrate 110 and the counter substrate 120 can still be realized. However, in the case of block capacitive plates as shown in FIG. 5, enhancement of the signal to be transmitted will not be achieved like in FIG. 4, because no electromagnetic induction phenomenon will occur during the charge and discharge process of the parallel plate capacitor. However, by using the same block patterns, the manufacture process will be made even simpler, and the technical problem of conduction between the array substrate

110 and the counter substrate 120 to be solved by this disclosure will also be addressed.

Figure 6:
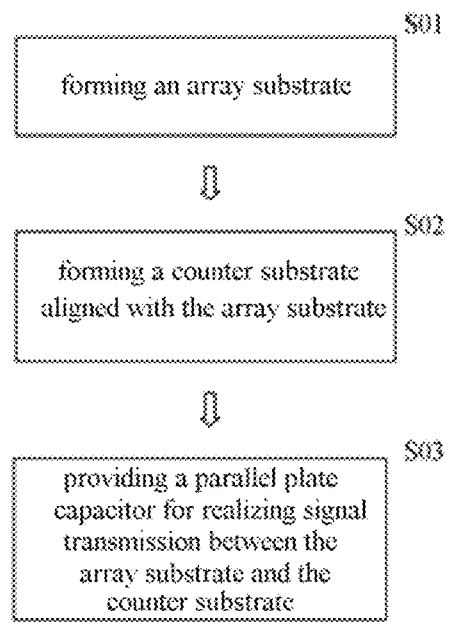
FIG. 6 is a schematic flow diagram of a method for forming a display panel according to an embodiment of this disclosure.

According to another embodiment of this disclosure, a method for forming a display panel is further provided. As shown in FIG. 6, a flow diagram of such a method according to an embodiment of this disclosure is schematically shown. The method can comprise the following steps: forming S01 an array substrate; forming S02 a counter substrate aligned with the array substrate; and providing S03 a parallel plate capacitor for realizing signal transmission between the array substrate and the counter substrate, wherein two capacitive plates of the parallel plate capacitor are located on opposite surfaces of the array substrate and the counter substrate respectively. Specifically, the array substrate, the counter substrate and the capacitive plates can be formed by using various manufacture processes known in the art, e.g., by deposition, coating, sputtering or plating. Besides, the capacitive plate on the array substrate can be made of an ITO material, while the capacitive plate on the counter substrate can be made of an ITO material or a metal material.

Additionally, according to an embodiment of this disclosure, the method for forming a display panel can further optionally comprise: forming a sensing electrode and a driving electrode on a surface of the counter substrate facing the array substrate respectively. In this case, a touch function will be added to the display panel formed by the method provided in any of the above embodiments of this disclosure, thereby achieving touch display. Meanwhile, by using the parallel plate capacitor, signal transmission between the array substrate and the counter substrate can be realized.

Additionally, according to an embodiment of this disclosure, the method for forming a display panel can further optionally comprise: forming a sensing electrode on a surface of the counter substrate facing the array substrate; and forming a driving electrode on a surface of the array substrate facing the counter substrate. Besides, the signal to be transmitted can comprise a touch signal, e.g., a pulse square wave signal as shown in FIG. 3. With such an arrangement, transmission of a touch signal between the counter substrate and the array substrate can be realized. Likewise, the sensing electrode and the driving electrode can be formed by using a process well known in the art, e.g., by deposition, coating, sputtering or plating.

Besides, the capacitive plates can be designed to have a ring shape. Besides, a ring number of the capacitive plate on the array substrate can be set to be smaller than that of the capacitive plate on the counter substrate. Alternatively, a ring number of the capacitive plate on the counter substrate can be set to be smaller than that of the capacitive plate on the array substrate. Accordingly, by taking advantage of the electromagnetic induction phenomenon occurring during the charge and discharge process of the capacitor, enhancement of the signal to be transmitted will be facilitated, and thus loss of the signal during normal transmission will be compensated to a certain degree.

In addition, the method for forming a display panel provided in the embodiments of this disclosure can optionally comprise: reducing a distance between the capacitive plates 130 and 140 to facilitate transmission of the signal. When the distance between the capacitive plates 130 and 140 is reduced, the capacitance of the parallel plate capacitor will be decreased, and thereby output of the signal transmitted therethrough will be enhanced.

In conclusion, in the technical solution of this disclosure, conduction between the array substrate and the counter substrate is realized by taking advantage of transmittability characteristics of alternating signals through a capacitor. As compared with the existing technical solution using conductive gold balls, this disclosure only needs to form corresponding capacitive plate layers on the array substrate and the counter substrate respectively, without any objects to be sandwiched between the two substrates. In this way, not only the manufacture process of the display panel is simplified while still realizing signal transmission, but also problems such as non-uniform overall cell thickness of the display panel caused by existence of any object in the cell will be avoided. Moreover, with a special shape design of the capacitive plates, i.e., the ring-shaped design in the embodiments of this disclosure, not only is signal transmission between two substrates realized, but also an electromagnetic field will be generated between the capacitive plates by taking advantage of the electromagnetic induction phenomenon. Given the existence of such an electromagnetic field, the ring turn number of the two capacitive plates can be further adjusted such that a ring number of the input end is smaller than that of the output end. This helps to allow facilitating enhancement of the signal to be transmitted, and thereby compensates loss of the signal during normal transmission to a certain degree.

An embodiment of this disclosure further provides a display device, comprising any of the display panels mentioned above. The display device in an embodiment can be any product or component having a display function, such as a display panel, electronic paper, a handset, a tablet computer, a television, a notebook computer, a digital photo frame, a navigator and the like.

It should be pointed out that in all depictions of this disclosure, orientational or positional relationships indicated by terms such as "center", "up", "down", "front", "back", "left", "right", "vertical", "horizontal", "top", "bottom", "in" and "out" are orientational or positional relationships described based on the drawings. This is only used for facilitating and simplifying the depiction of this disclosure, instead of implying that the involved device or element must have a specific orientation or be constructed or operated in a specific orientation. Hence, they cannot be construed as limiting this disclosure.

Terms such as "first" and "second" are used for descriptive purposes and should not be construed as indicating or suggesting relative importance or implying a number of the technical feature involved. Therefore, features defined by terms such as "first" and "second" may indicate explicitly or implicitly that one or more such features are comprised. In all depictions of this disclosure, unless otherwise explicitly indicated, "multiple" means two or more.

It should be pointed out that in all depictions of this disclosure, unless otherwise explicitly prescribed or defined, terms such as "mounting", "joining" and "connection" should be understood in a broader sense. For example, the connection can be direct connection, or indirect connection via an intermediate media, or internal communication of two elements. For those having ordinary skills in the art, specific meanings of the above terms in this disclosure can be construed in light of specific situations.

In the depictions of this description, any specific feature, structure, material or characteristic can be combined in a suitable manner in any one or more embodiments or examples.

The above contents are only specific embodiments of this disclosure, but the protection scope of this disclosure is not limited thereto. Within the technical scope disclosed in this disclosure, any skilled person familiar with this technical field can easily conceive of various modifications or replacements, and all such modifications or replacements should fall within the protection scope of this disclosure. Therefore, the protection scope of this disclosure should be subject to that of the appended claims.

LIST OF REFERENCE SIGNS 10, 20 display panel
110, 210 array substrate
120, 220 counter substrate
130, 140, 230, 240 capacitive plate
Rx sensing electrode
Tx driving electrode

The invention claimed is:

1. A display panel comprising:
   an array substrate;
   a counter substrate aligned with the array substrate;
   a parallel plate capacitor for realizing transmission of a signal between the array substrate and the counter substrate, wherein one capacitive plate of the parallel plate capacitor is located on a surface of the array substrate facing the counter substrate, while the other capacitive plate of the parallel plate capacitor is located on a surface of the counter substrate facing the array substrate; and
   a sensing electrode located on the surface of the counter substrate facing the array substrate and independent from the other capacitive plate of the parallel plate capacitor,
   wherein the signal is transmitted by the parallel plate capacitor from the array substrate to the sensing electrode in the counter substrate,
   wherein the display panel further comprises a driving electrode located on the surface of the counter substrate facing the array substrate and independent from the other capacitive plate of the parallel plate capacitor, and
   wherein the signal is transmitted further by the parallel plate capacitor from the array substrate to the driving electrode in the counter substrate.

2. The display panel according to claim 1, wherein the signal comprises a touch signal.

3. The display panel according to claim 1, wherein the capacitive plates are designed to have a ring shape, and
   a ring number of the capacitive plate on the array substrate is smaller than that of the capacitive plate on the counter substrate, or a ring number of the capacitive plate on the counter substrate is smaller than that of the capacitive plate on the array substrate.

4. The display panel according to claim 3, wherein the capacitive plate on the array substrate is designed to have a single-ring shape and the capacitive plate on the counter substrate is designed to have a double-ring shape by means of two metal layers, or
   the capacitive plate on the counter substrate is designed to have a single-ring shape and the capacitive plate on the array substrate is designed to have a double-ring shape by means of two metal layers.

5. The display panel according to claim 3, wherein the rings comprise square rings, circular rings or polygonal rings.

6. The display panel according to claim 1, wherein a distance between the capacitive plates is reduced to facilitate transmission of the signal.

7. The display panel according to claim 1, wherein the capacitive plates are designed to have same block patterns.

8. The display panel according to claim 7, wherein the block patterns comprise square blocks, circular blocks or polygonal blocks.

9. The display panel according to claim 1, wherein the capacitive plate on the array substrate is an indium tin oxide (ITO) layer.

10. The display panel according to claim 1, wherein the capacitive plate on the counter substrate is an indium tin oxide (ITO) layer or a metal layer.

11. The display panel according to claim 1, further comprising:
    a black shielding layer located between the counter substrate and the capacitive plate thereon.

12. The display panel according to claim 1, further comprising:
    an insulating layer located over the array substrate and the capacitive plate thereon.

13. A display device comprising the display panel according to claim 1.

14. A method for forming a display panel comprising:
    forming an array substrate;
    forming a counter substrate aligned with the array substrate;
    providing a parallel plate capacitor for realizing transmission of a signal between the array substrate and the counter substrate, wherein one capacitive plate of the parallel plate capacitor is located on a surface of the array substrate facing the counter substrate, while the other capacitive plate of the parallel plate capacitor is located on a surface of the counter substrate facing the array substrate; and
    forming a sensing electrode on the surface of the counter substrate facing the array substrate, wherein the sensing electrode is independent from the other capacitive plate of the parallel plate capacitor, and the signal is transmitted by the parallel plate capacitor from the array substrate to the sensing electrode in the counter substrate,
    wherein the method further comprises forming a driving electrode on the surface of the counter substrate facing the array substrate and independent from the other capacitive plate of the parallel plate capacitor, and
    wherein the signal is transmitted further by the parallel plate capacitor from the array substrate to the driving electrode in the counter substrate.

15. The method according to claim 14, wherein the capacitive plates are designed to have a ring shape, and
    a ring number of the capacitive plate on the array substrate is smaller than that of the capacitive plate on the counter substrate, or a ring number of the capacitive plate on the counter substrate is smaller than that of the capacitive plate on the array substrate.

16. The method according to claim 14, further comprising:
    reducing a distance between the capacitive plates to facilitate transmission of the signal.

* * * * *